Dec. 19, 1961    R. E. BAKER ET AL    3,013,600
PNEUMATICALLY OPERATED TUBE EXPANSION CONTROL
Filed July 16, 1958    6 Sheets-Sheet 1

INVENTORS
ROBERT E. BAKER
PAUL W. MARTIN
BY Toulmin & Toulmin
ATTORNEYS

FIG-2B

Dec. 19, 1961 R. E. BAKER ET AL 3,013,600
PNEUMATICALLY OPERATED TUBE EXPANSION CONTROL
Filed July 16, 1958 6 Sheets-Sheet 6

INVENTORS
ROBERT E. BAKER
PAUL W. MARTIN
BY Toulmin & Toulmin
ATTORNEYS

United States Patent Office 3,013,600
Patented Dec. 19, 1961

3,013,600
PNEUMATICALLY OPERATED TUBE EXPANSION CONTROL
Robert E. Baker and Paul W. Martin, Springfield, Ohio, assignors to The Airetool Manufacturing Company, Springfield, Ohio, a corporation of Ohio
Filed July 16, 1958, Ser. No. 748,998
7 Claims. (Cl. 153—82)

This invention relates to apparatus for the expansion of tubes into tube seats such as in condensers and heat exchange equipment. More particularly the invention relates to a precision control arrangement which senses and measures torque output and automatically stops action of the tool effecting the work operation. Still more particularly the invention relates to a simplified torque release cam mechanism.

The expansion of tubes into tube sheets is frequently time consuming as considerable care must be exercised to attain the correct degree of tightness between the tube and the sheet. Under expansion of a tube will result in leaks; over expansion of the tube in the sheet may result in distortion or breakage of ligaments in the tube sheet, as well as occasioning weakness in the tube itself.

Further tube expansion operations, while involving high pressures on the mandrel of the expander, customarily involve only a relatively slight expansion of the tube itself to attain full expansion—normally about 0.003" on the tube diameter. This expansion however must be smooth to avoid cracking the tube and accordingly the control device of the expander must respond accurately to gradually increasing torque on the mandrel spindle and associated torque cam mechanism.

It is a primary object of this invention to provide a novel, dependable pneumatically operated control which enables tubes to be accurately seated in their sheets according to a predetermined degree of tightness.

It is an important object of this invention to provide a novel pneumatically operated control which may be supported manually by an operator while expanding tubes into tube sheets and which control automatically stops a work operation and provides, by reason of a simple manipulation, for re-setting of the control for effecting another tube expansion.

It is also an object of ths invention to describe a novel torque sensing cam mechanism which is accurate to within 0.001 of an inch in aiding the seating of tubes in tube sheets.

It is a further object of this invention to describe a novel pneumatically operated control having separate self contained motor and torque sections which provide for simplicity in maintainance and assembly.

A particular object of the invention is to provide a device for tube expansion control which device includes a torque sensing, torque responsive cam mechanism which is at all times actuable in both directions of rotation.

Still another object of the invention is to provide a novel pneumatically operated reversibly drivable control which is of simple construction, composed of readily assembled parts, all so constructed and arranged as to preclude breakage or derangement of the same, which device is positive and accurate and of relatively low weight, such that it may be supported manually in operation; and which has proved thoroughly reliable and efficient in the attainment of the ends for which it is designed.

Another and important object of the invention is to provide a device for tube expansion control wherein the control effected is independent of fluctuations in the power supply.

The invention will be more fully understood by reference to the following detailed description and accompanying drawings wherein.

Figure 1:
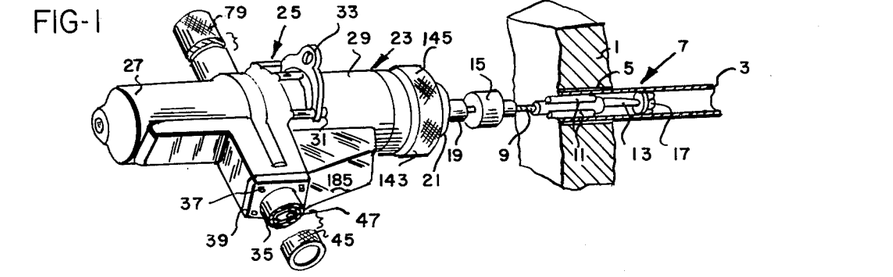
FIGURE 1 is a perspective view of one embodiment of the invention, the control device for tube expansion being illustrated in association with a tube expander and the expander being shown positioned in a seat of a tube sheet.

Referring to the drawings and initially particularly to FIGURE 1, the numeral 1 designates a tube sheet in which a tube 3 has been inserted on the seat 5. This tube is to be expanded into secure contact with the seat by means of the expander generally indicated at 7. As shown the expander includes an exteriorly threaded cage 9 which forwardly houses expansion rolls 11; a longitudinally extending tapered mandrel 13 passes completely through the cage.

The operation of the expander 7 is conventional in that the mandrel moving through the cage into the header or tube sheet expands the rolls in the cage outwardly against the tube 3 and as expansion continues the tube is expanded against the seat 5. As shown in FIGURE 1 the rolls 11 are at a slight angle to the axis of the cage, which causes self-feeding of the mandrel through the cage when the mandrel is driven in a forward rotational direction. The angular arrangement also aids in attainment of uniform expansion without producing any sharp offset inside the tube.

A stop member 15 in the form of a ball bearing thrust collar is carried on the cage and is adapted to limit the depth of entry of the cage and rolls into the sheet by abutment with the outer face of tube sheet 1. At the start of the expanding operation the stop member is positioned against the face of the tube sheet by threading it forwardly on cage 9 and the cage and rolls are maintained positioned relative to the tube sheet as the mandrel self feeds in.

The procedure illustrated in FIGURE 1 is a first step in a conventional step rolling of the tube into the seat. In step rolling the tube is rolled in increments; however it is to be understood that the apparatus to be described is not limited to step rolling, such being illustrated as merely exemplary.

Referring again to FIGURE 1 the mandrel 13 is provided at its forward end with a suitable nut 17 to prevent accidental withdrawal of the mandrel rearwardly through the cage when the expander is being made ready for mounting.

The mandrel at its rearward end is supported in a chuck 19 suitably of a quick change type. Chuck 19 is provided on the end of spindle 21 which spindle forms a portion of the control device designated generally by the numeral 23 in FIGURE 1 and shown in detail in FIGURES 2A and 2B, and 3A and 3B.

The control device has a housing designated generally at 25 in FIGURE 1 formed by casing portions 27 and 29 bolted together as at 31 (FIGURE 1). Casing portion 27 is a motor casing, while casing portion 29 is suitably termed a cam casing.

Also, as shown in FIGURE 1, a support ring 33 projects from a pair of the bolts 31 and is adapted for overhead suspension of the tube expansion control to relieve an operator of the necessity of supporting the control manually on long jobs.

Figure 2A:
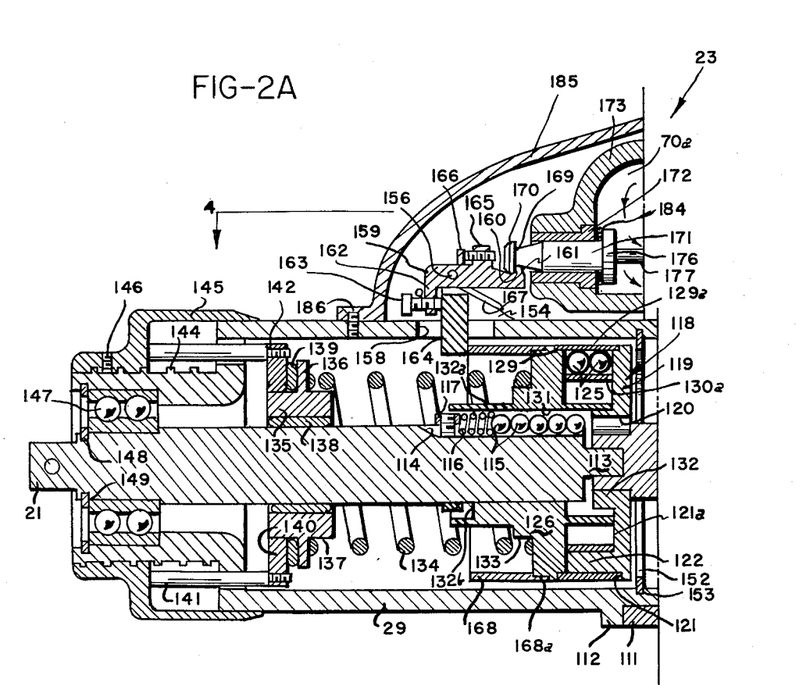
FIGURES 2A and 2B, which are broken views, together form a longitudinal sectional and enlarged view of the control of FIGURE 1 with portions cut away to illustrate air flow to the pneumatic motor of the control but with the control in an initial stage of a tube expanding operation with the pneumatic motor operating in a forward direction.
Figure 2B:
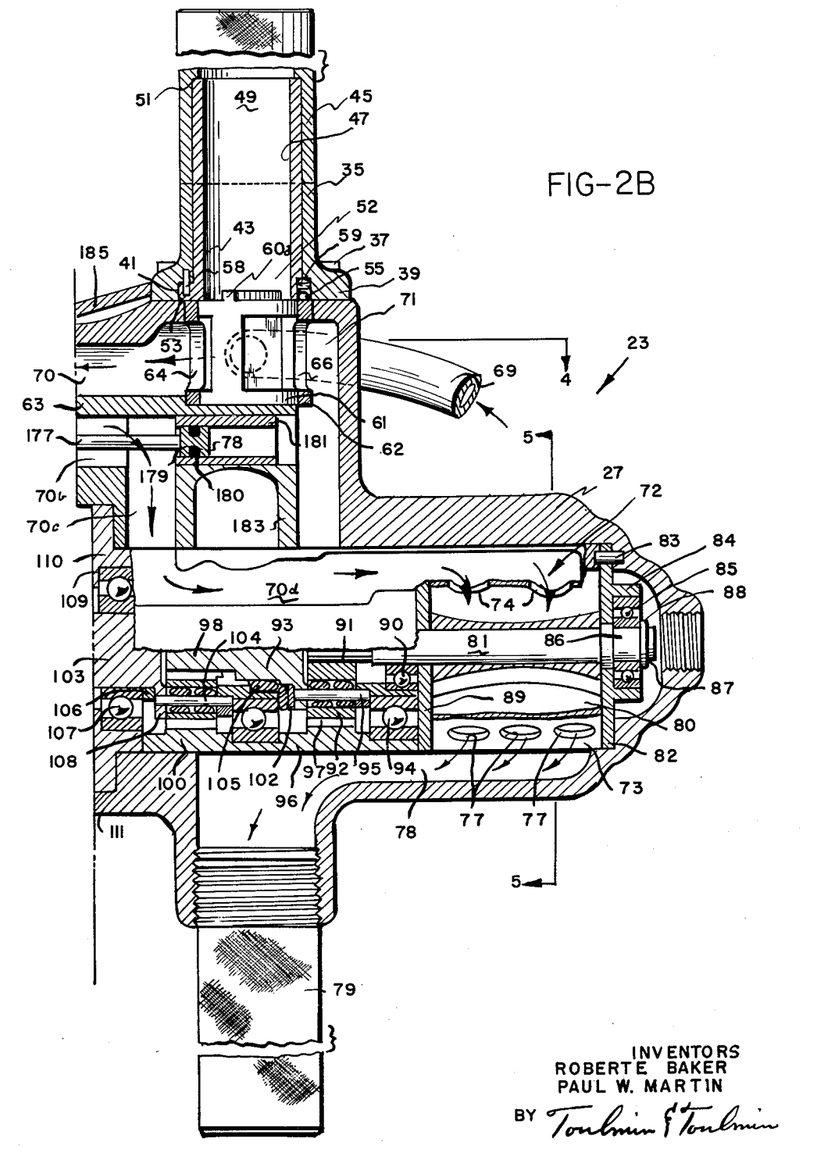
Figure 3A:
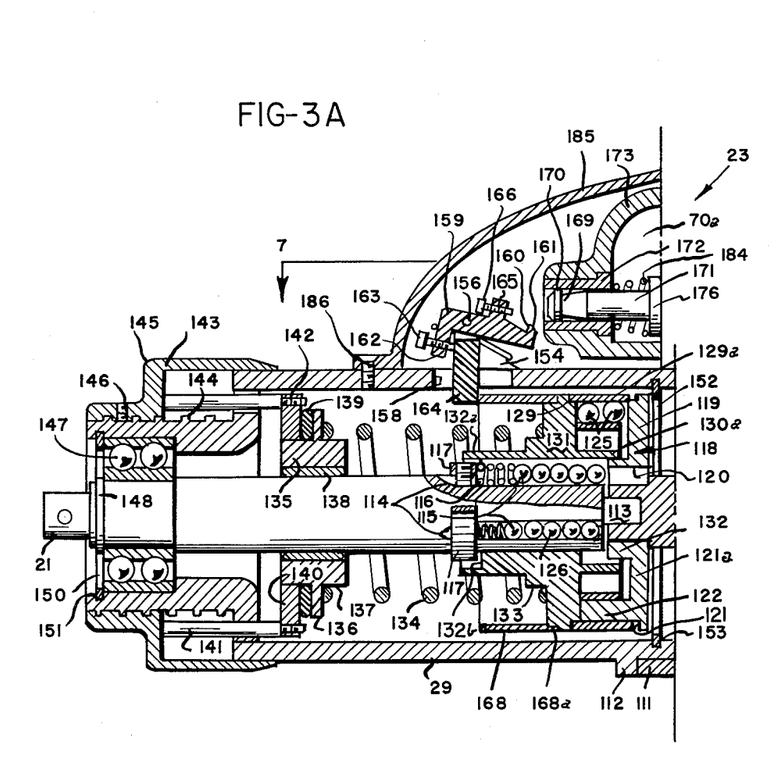
FIGURE 3A is a view similar to that of FIGURE 2A but with the torque sensing mechanism in an actuated position.
Figure 3B:
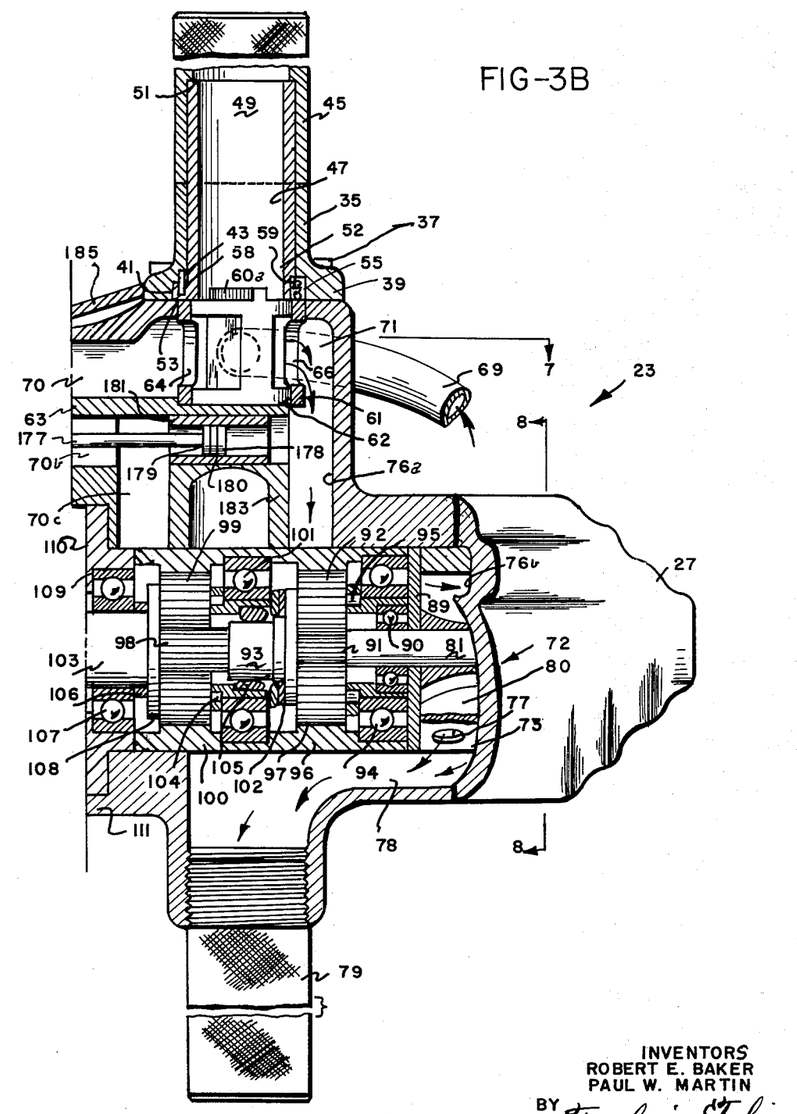
FIGURE 3B is a view similar to that of FIGURE 3A but with the air flow directed to drive the mechanism in an opposite rotational direction to that shown in FIGURE 2B.

Referring now particularly to FIGURES 2B and 3B a retainer 35, tubular in form, is secured to casing portion 27 by threaded bolts 37 passing through flange 39 of the retainer. The retainer is provided with an annular recess 41 internally of flange 39 and is also formed with an axially extending pin-receiving opening 43 which communicates with the annular recess 41.

A knurled tubular throttle grip 45 coaxial with the retainer 35 extends into substantial abutment with the upper end of the retainer 35 and is press fitted over a valve actuator 47, the upper tubular portion 49 of which actuator extends into abutment with an internal shoulder 51 of the grip.

Figure 9:
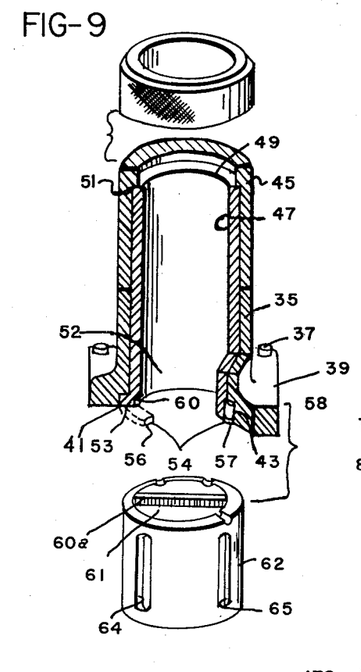
FIGURE 9 is an exploded and fragmentary view illustrating the arrangement of the manually operable valve means of the control.

The valve actuator 47 at its upper tubular portion 49 is sleeved within the retainer 35 for rotation; the lower portion 52 of the valve actuator, as shown in FIGURES 2B, 3B and 9, is formed with a peripheral projecting lip 53 having a peripheral cutout portion 54 and a bore 55 opposite the cutout portion.

The cutout portion 54 extends about the periphery for somewhat greater than about 90° and the opposed ends of the cutout portion have abutments 56, 57 for engagement with a pin 58. As shown most clearly in FIGURE 9 the lip 53 of the valve actuator is received within the annular recess 41 of the retainer 35 in such manner that the pin 58 in the opening 43 of the retainer projects into the cutout portion 54 of lip 53.

Also, engagement of lip 53 in the recess prevents axial movement of the valve actuator relative to the retainer. Suitably a lock spring 59 comprising a ball biased spring is provided in the bore 55 to hold the actuator and retainer in engagement resiliently.

The tubular valve actuator 47 is also slotted diametrically through the lip 53 and the lower body of the actuator at points removed from the cutout portion 54 and bore 55 to provide a slot 60 which is adapted to receive an upwardly extending rib 60a of a directional valve member 61.

Directional valve member 61 is itself rotatably mounted in valve sleeve 62 but is prevented from axial movement relative to the sleeve. Sleeve 62 is fixedly supported by the casing portion and an internal wall portion 63 of the casing and comprises ports 64, 65, 66, 67 spaced at approximately 90° intervals around the sleeve and extending longitudinally of the sleeve (FIGURES 2B, 3B, 4 and 7).

Figure 8:
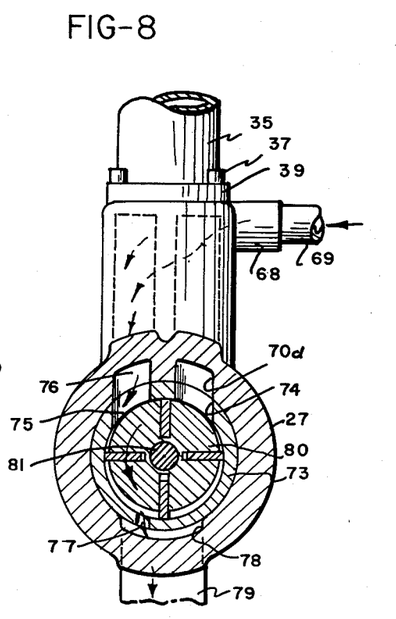
FIGURE 8 is a fragmentary view taken on line 8—8 of FIGURE 3B.

A nipple 68 (FIGURES 5 and 8) formed on casing portion 27 receives an inlet conduit 69 and communicates an air supply (not shown) with the interior of the sleeve. Accordingly by rotating the grip 45 the valve actuator 47 is rotated and with it the rib 60a and valve member 61 to thereby direct air flow through the valve either to passage 70 (FIGURE 2B) or passage 71 (FIGURE 3B).

Passage 70 communicates with a spacing 70a (FIGURE 2A) and passages 70b, 70c and 70d (FIGURE 2B) to form a sinuous passageway from the valve to a pneumatic motor designated generally at 72.

The pneumatic motor comprises a cylinder 73 (FIGURES 2B and 5) having a pair of inlet ports 74 spaced along the length of the cylinder and communicable with the passage 70d. A second pair of inlet ports 75 (FIGURE 5) spaced peripherally about 90° from the inlet port 74 communicates through a passageway 76 formed by the passages 76a and 76b with the valve sleeve 62 for providing reverse rotation of the motor 72.

Figures 4, 5, 6:
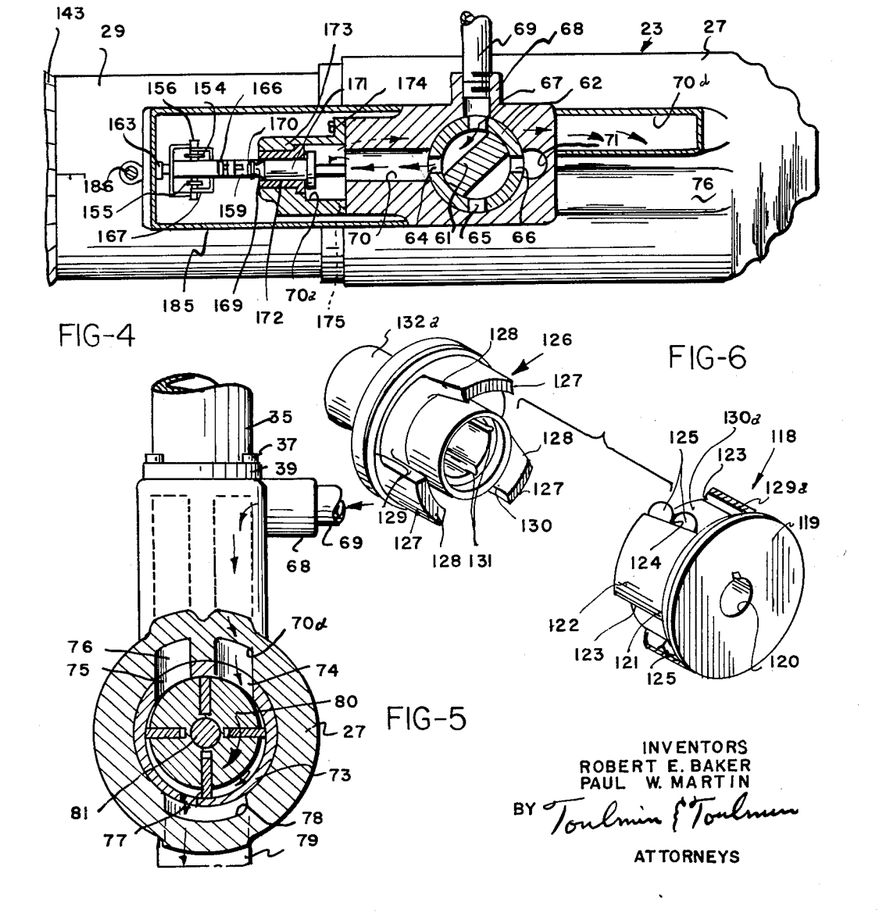
FIGURE 4 is a fragmentary view partially in section taken substantially on line 4—4 of FIGURES 2A and 2B.
FIGURE 5 is a fragmentary view partially in section taken on line 5—5 of FIGURE 2B.
FIGURE 6 is an exploded view in perspective of the torque sensing cam mechanism.

As shown in FIGURE 5 the cylinder 73 is formed eccentrically and provided with outlet ports 77 which communicate through a passageway 78 with a hollow grip 79 (FIGURE 3B) forming the exhaust. Grip 79 may suitably be provided with a muffler (not shown).

A rotor 80 (FIGURES 2B and 5) is mounted within the cylinder 73 and is secured to a rotor shaft 81. Rotor shaft 81 is provided rightwardly (FIGURE 2B) with a peripheral protuberance with fits rotatably into a rear thrust member 82.

Thrust member 82 is fixedly mounted in the casing portion 27 by pins as at 83, which pins are received in the casing portion 27 and extend through the thrust member 82 into the rearward end of the cylinder 73 to retain the cylinder in position.

Thrust member 82 closes the rearward end of the cylinder and is itself provided with an annular projection 84 which receives ball bearing 85 for rotatable support of the rotor shaft at portion 86 of the shaft.

Rotor shaft portion 86 is provided rightwardly (FIGURE 2B) with a groove 87 which receives split retainer ring 88 and abuts the race of the bearing 85 to retain the rotor shaft against longitudinal movement.

Forwardly the cylinder 73 is closed by a thrust plate 89 through which the rotor shaft passes, the rotor shaft being supported by ball bearing 90. At its forward extremity the rotor shaft 81 is provided with gear teeth 91 which mesh with planet gears 92. Planet gears 92 are carried on an intermediate gear spider 93, which at its right hand end (FIGURE 3B) engages between the outer race of bearing 90 and the inner race of ball bearing 94.

Shafts 95 of the planet gears 92 are carried by the spider 93. A gear housing 96 is provided with an internal gear 97 which meshes with the planet gears 92; rightwardly the gear housing retains the outer race of ball bearing 94 and the gear housing is itself fixedly secured to the casing. The intermediate gear spider 93 at its leftward end (FIGURES 2B and 3B) is provided with gear teeth 98 which engage a trio of planet gears 99, and which planet gears are in mesh with the teeth of an internal gear carried on a second gear housing 100. The gear housing 100 is identical with gear housing 96 and coaxial therewith.

The intermediate spider 93, as shown in FIGURE 3B, is suitably supported by bearing 101 and axial movement is inhibited by a thrust washer as at 102. A drive spider 103 supports the shafts 104 of the planet gears 99, and at its rightward end projects between bearings 101 and the inner race of a supporting bearing 105. Thus the drive spider at its rightward end is disposed about the leftward end of the intermediate gear spider.

A spacer ring 106 spaces a ball bearing 107 from the support projection 108 of the spider and the bearing 107 is itself received into a recess 109 of a bearing support 110. This bearing support is formed with a central aperture through which the driving spider 103 passes longitudinally and the bearing support itself is seated on an inwardly extending shoulder 111 formed in the casing portion 27 and is retained against longitudinal movement by abutment with an inner end of casing portion 29 (FIGURE 2A).

A rightward projection of the bearing support engages against the gear housing 100 (FIGURE 3B); thus the intermediate spider and the driving spider are well supported and are retained against longitudinal movement as are the gear housings.

The casing portion 29 is substantially cylindrical at the right hand end thereof (FIGURE 2A) and the periphery is provided with a flange 112 drilled through at a plurality of spaced points to receive bolts 31 (FIGURE 1) for securing the casing portion 29 to the casing portion 27.

The casing portion 29 receives axially therethrough the spindle 21 which is provided with an extension 113 which projects into and is rotatable within a recess within the driving spider 103.

The spindle at its rightward end (FIGURE 2A) is provided with a trio of longitudinally extending V-slots 114. These slots at their forward end taper gradually to the spindle surface and rearwardly are somewhat deeper to receive a plurality of ball bearings 115, which are normally biased rightwardly by guide springs 116. The guide springs abut a lock ring 117 disposed annularly about spindle 21 and secured to the spindle 21 by a set screw in each slot.

Keyed to the driving spider is a drive cam member 118 formed as most clearly shown in FIGURE 6. The drive cam member includes a plate portion 119 apertured through at 120 and provided with a keyway and having a raised face 121a defining a peripheral ledge 121. The drive cam member 118 is also provided (FIGURE 6) with three leftwardly substantially axially projecting equally peripherally spaced teeth 122 in the form of circular segments which extend from the face 121a. Each tooth occupies a portion of the circumference of the drive cam member of somewhat less than 60°. Further each tooth is provided with an axially extending face 123 and a cam face 124; cam face 124 is machined as a true helix. The cam faces serve to transmit torque in one direction and to provide an axial component of force tending to displace the cam members relatively axially; while the faces 123 occasion no substantial axial displacement and provide for the transmission of torque in the reverse direction of rotation. The driving cam teeth are interleaved with teeth of the driven cam member now to be described.

As illustrated in FIGURE 6 a pair of ball bearings 125 lie against each angularly disposed face of the driving cam teeth. A driven cam member 126, termed the operating cam member, is provided with teeth 127 which are similar to those on the driving cam member and are so disposed as to bear with their faces 128, formed as a true helix, against the ball bearings 125 when the driving and driven cam members are brought together.

It is to be particularly noted that the faces, while engaging the balls 125, are each formed as true helixes and that the faces are parallel and lock the balls between them, in the parallel relation of the faces in the operation of the device.

With this arrangement rolling friction between the drive cam member and the driven cam member exists, the sliding friction effect being substantially nil.

The lead generated on the helix face is of some importance also; too large a lead results in sliding friction, contributing to less reliable operation; a lead which is too small tends to shorten the life of the regulating spring 134, referred to hereinafter. A lead of about 23″ formed by the cam face and an axial line has proven satisfactory in practice. Thus there will be an advance of about 23″ in one revolution.

The driven cam member 126 is provided with a peripheral ledge 129 and an outer annular ring 129a, serving as a ball retainer, is slipped on the ledge 129 and over the ledge at 121 to retain the ball bearings from outward movement; most suitably the ring 129a has a slip fit on the ledge 129. Due to the parallel relation of the faces 124 and 128 there is substantially no radial component of force on the balls 125, and binding of the balls by the ball retainer 129a is substantially eliminated.

Each of the teeth of the driving and driven cam members are formed on their inner surfaces as at 130 as arcs of a circle and an inner ring 130a abuts the inner surfaces of the teeth and restrains the ball bearings from movement inwardly. In the assembly of the clutch device rings 129a and 130a are preferably simply slipped into position, as this provides for ready manufacturing and disassembly for repair.

The driven cam member 126 (FIGURE 2A) is annularly disposed about the spindle 21 and is itself provided with three V-shaped grooves 131 (FIGURE 6), corresponding to the V-shaped grooves of the spindle, and which grooves receive and seat the ball bearings 115. Ball bearings 115 provide the drive connection between the driven cam member and the spindle.

The driven cam member is provided with a longitudinal extension 132a (FIGURE 3A) to provide for engagement with the spring biased balls 115 substantially over the length of the slot 114; the hub 132 of the drive cam member limits ball movement rightwardly (FIGURE 2A). Ball movement leftwardly (FIGURE 2A) is positively limited by engagement of the internal shoulder 132b of the driven cam member with the lock ring 117. It is to be noted that the guide springs 116 are not intended to be fully compressed by ball movement and abument of the shoulder 132b with the lock ring limits spring compression.

The driven cam member is also formed leftwardly with the annular seat 133 which receives one end of a regulating spring 134. Spring 134 is compressed between the driven cam member and a spring guide 135 which is in the form of a hollow cylinder having a peripheral projection 136 which defines on the spring guide a seat 137 for the second end of the regulating spring.

A suitable spring 134 in practice has been formed of $5/32''$ wire and provides a deflection of 31 pounds plus one pound minus nothing per $1/2''$ deflection; the spring ends are suitably squared with each other.

The spring guide is annularly disposed about spindle 21 and a needle bearing 138 is provided between the guide and spindle. A second peripheral seat of the spring guide receives an angularly disposed bearing 139 which abuts the projection 136 and receives in rotatable engagement pressure pins 141.

The pressure pad is in the form of an annulus and is provided with three axially extending bores, which each threadedly receives pressure pins as at 142. Pressure pins 141 extend axially of the device through bores formed in a leftward portion of the casing 29.

The pressure pins are adapted to abut the interior surface of an adjusting nut 143. Adjusting nut 143 is internally threaded and is threadedly received on external threads 144 of the casing portion 29. The adjusting nut is knurled on its exterior surface at 145 (FIGURE 1) and is provided with a rim portion in the form of a calibrated ring (FIGURES 4 and 7) which cooperates with indicia on the exterior of the casing portion 29.

Threading of the adjusting nut 143 inwardly of the casing urges the pressure pad and spring guide rightwardly and increases compression force on the regulating spring, and hence increases the force with which the driven cam member is urged toward the driving cam member. A set screw 146 is conveniently provided to fix the adjusting nut 143 in its adjusted position.

In practice pressures as low as 0.5 ft. pound and up to 37 ft. pounds torque at 90 pounds per square inch air pressure have been employed.

The left hand end of spindle 21 is rotatably supported by ball bearing 147, the inner race of which is abutted by a spring retainer 148 seated in a groove 149 of the spindle, and the outer race of which is abutted by a spring retainer 150 seated in a groove 151 of the casing portion 29.

Rightwardly (FIGURE 2A) a C-ring 152 is engaged in an internal groove 153 of the casing portion 29 to restrain rightward movement of the driving cam member and to assist in retaining the components within the casing portion 29 positioned.

Intermediate its length the casing portion 29 is provided (FIGURES 2A and 7) with upwardly projecting peripherally disposed lugs 154, 155 which are bored to receive a pin 156. A follower 164 in the form of a rectangular block, the upper end of which is provided as a yoke, is pivotally mounted on the pin and depends through a longitudinally extending aperture 158 of the casing portion 29. The pin also receives a trip 159 which is bored intermediate its length for receipt of the pin. At its rightward end (FIGURE 2A) the trip is formed with a hooked portion 160 having an outer cam surface 161. Rearwardly the trip has a depending portion 162 which is bored and threaded internally to receive threadedly a screw 163 in the form of a stop.

The trip 159 is also provided with an upwardly extending projection 165 (FIGURE 2A) which projection is bored to receive an adjusting screw 166. A trip spring 167 extends around the lugs 154, 155 and normally retains the trip in the position shown in FIGURE 2A.

Adjacent the follower 164 within the casing portion is a cam extension 168 in the form of a hollow cylindrical member annularly disposed about the spindle 21, formed with a peripheral seat and positioned on the ledge 168a of the driven cam member. This cam extension is provided to move with the driven clutch member and to abut the follower 164 and to urge the follower forwardly in the slot 158 against the screw 163. Thus actuation of the torque cam mechanism is adapted to pivot the follower into contact with the screw on the depending portion of the follower and to pivot the trip downwardly (FIGURE 3A).

Figure 7:
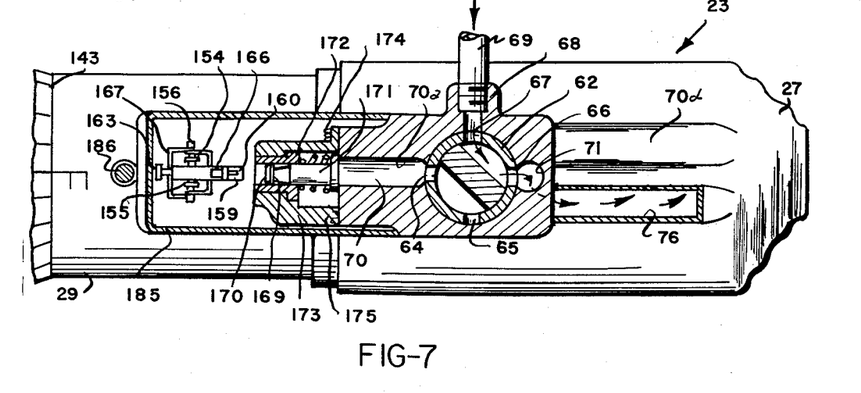
FIGURE 7 is a fragmentary view taken on line 7—7 of FIGURES 3A and 3B.

Referring again to the trip, the hook end thereof is adapted to engage a rear surface 169 of a conical head portion 170 of a valve 171. The valve stem extends through a bushing 172 (FIGURE 2A) engaged in a recess of a valve box 173. This valve box is bolted in any suitable manner to the casing portion 27 as at 174, 175 (FIGURES 4 and 7). The valve box is recessed to form the spacing 70a which communicates with the passage 70 and the valve sleeve 62, and to which reference has already been made.

Integral with the valve stem is a cylindrical enlargement 176 which is of a size sufficient to close the passage 70b (FIGURE 2B). The closure enlargement and valve stem are bored to receive therein a valve control rod 177, which is suitably pinned or otherwise secured to the enlargement.

The valve control rod at its rightward end (FIGURE 2B) is provided with spaced flanges 178, 179 and between which gasket material 180 is secured. Thus the rightward end of the valve control rod forms a piston which fits flush with a cylindrical bushing 181 supported fixedly between the casing portions 63 and 183.

Mounted between the face of the valve box 173 and the enlargement 176 is a shut-off spring 184 which normally biases the enlargement towards the passage 70b. Extending over the valve mechanism just described is a casing portion 185 which is pinned to the casing portion 29 at 186.

In the operation of the device to seat a tube in a tube sheet, the operator first sets the regulating spring to a desired compression by means of nut 143 and locks the nut in position. This setting may then remain throughout the expansion of a whole series of tubes.

Then the operator positions the expander in the tube with the rolls positioned to be expanded and the stop member 15 in contact with the face of tube sheet 1. Expansion of the rolls takes place as tapered mandrel is driven and self fed through the cage and rolls into the tube sheet.

The operator turns the throttle grip 45 to drive the air motor in a forward direction to set the spindle 21 in motion, and the mandrel is advanced into the sheet through the rolls which move outwardly of the cage against the tube and press the tube into contact with the seat.

The torque on the mandrel and spindle increases gradually as the rolls pressure the tube. When the torque reaches such a point that the compression of the regulating spring 134 is overcome the driven cam member tends to separate from the driving cam member. This separating movement is slight—about 3/32 of an inch to an 1/8 of an inch generally, and the separation is insufficient to cause the teeth to move from their interleaving position. Consequently the torque sensing cam mechanism is always in position to drive the spindle. The bails or ball bearings 125 between the cam faces of the cam member facilitate the movement of the driven cam member, reduce the friction, and improve the accuracy of the device.

Movement of the driven cam member occasions movement of the cam extension 168, actuation of the follower 164 and trip 159 and closing of the air supply to the motor by release of the enlargement 176 to close the passage 70b (FIGURES 3A and 3B). This stops the air motor and the whole operation of the device is substantially an instantaneous one upon the build up of the torque to sufficient extent to overcome the spring 134.

It is to be noted that, as shown in FIGURE 3A, the annular ring 129a may tend to move with the driven cam member when it is simply fitted on the ledge 121; if desired this ring may be fitted or secured to inhibit such movement though such is not necessary.

The operator then, with the motor stopped, rotates the throttle grip 45 to provide the air supply to the motor in the reverse direction, that is through passages 76a and 76b (FIGURE 3B); the mandrel is then accordingly rotated in the reverse direction since the torque sensing cam mechanism is and has remained engaged. The tool is then withdrawn from the tube the mandrel self-feeding outwardly or in step rolling may be positioned into the sheet to roll the next portion of the tube.

As the air flow is reversed by the operator air pressure is developed on the face of flange 178 and the valve control rod 177 is forced leftwardly (FIGURE 3B), causing the conical head portion 170 to ride up the cam surface 161, returning the hooked portion 160 into engagement with the rear surface 169, as shown in FIGURE 2B.

The trip 159 biased by the spring 167 resets itself to the FIGURE 2A position substantially immediately upon stopping of the air motor drive; accordingly the trip is in position to receive the conical head portion 170 as the latter moves leftwardly.

The setting of the control may remain the same for each rolling operation and accordingly each portion of each tube and each tube of a series will all have the same predetermined force applied in the rolling operation.

Particular advantages of the control device for tube rolling include the automatic governing of the expansion by accurate measurement of torque; no adjustment is required in the equipment once the initial setting of the control has been made, and this may vary over a wide range of selection due to the regulating spring characteristics and the accuracy with which the torque sensing cam mechanism functions particularly when guided by ball bearings within driven cam member as at 115.

The air motor itself may be any air motor suitable to effect the functions described, but should, in general, for tube rolling purposes, operate at 90–100 pounds per spare inch air pressure.

Separation of the motor casing 27 from the cam casing portion 29 provides for easy maintenance.

In actual practice, due to the substantially complete elimination of necessity for adjustment, an operator can roll up to 12 tubes per minute on a continuous basis. The light weight provided by the casing portions of aluminum alloys facilitate such operation since fatigue is minimized. A most important factor, however, is the accuracy attained—to within 0.001 of an inch—due to the torque sensing mechanism, which is not influenced by fluctuations in air pressure.

Further the accuracy is greatly improved by this minimizing of friction through the use of the ball bearings between the interleaved cam face teeth and also by the support of the driven cam members on the ball bearings carried by the spindle.

It will be understood that this invention is susceptible to modification in order to adapt it to different usages and conditions and accordingly, it is desired to comprehend such modifications within this invention as may fall within the scope of the appended claims.

What is claimed is:

1. In a control device for combination with a tube expander having a mandrel, a rotatable drive shaft which is fixed against axial movement, a rotatable spindle retained against axial movement and adapted for retaining the mandrel of the tube expander, said spindle and drive shaft being in axial alignment but independently rotatable, a torque-sensing cam mechanism connecting the drive shaft to the spindle for the transmission of torque to the spindle, said cam mechanism comprising rolling friction-reducing members and co-axial interengaging cam members cooperable for the transmission of torque between the cam members and the cam members having axially projecting interleaved teeth provided with opposing helical, parallel cam faces engaging the rolling members serving to transmit torque and to provide an axial component of force tending to displace the cam members relatively axially, yieldable means biasing one of said cam members into engagement with the other axially and tending to prevent the axial displacement but yieldable upon a predetermined torque buildup to permit the displacement of the one said cam member relative to the other said cam member, said drive shaft and said spindle, and control means responsive to the axial displacement of the one said cam member, but while the teeth are yet partially interleaved for the transmission of torque to effect stopping of said drive shaft.

2. In a control device for combination with a tube expander having a mandrel, a rotatable drive shaft which is fixed against axial movement, a rotatable spindle retained against axial movement and adapted for retaining the mandrel of the tube expander, said spindle and drive shaft being in axial alignment but independently rotatable, a torque-sensing cam mechanism connecting the drive shaft to the spindle for the transmission of torque to the spindle, said cam mechanism comprising rolling friction-reducing members and co-axial interengaging driving and driven cam members cooperable for the transmission of torque between the cam members and the cam members having axially projecting interleaved teeth provided with opposing helical, parallel cam faces engaging the rolling members serving to transmit torque and to provide an axial component of force tending to displace the cam members relatively axially, a plurality of balls provided in at least three series spaced around the spindle supporting the driven cam member non-rotatably relative to the spindle for axial movement relative to the spindle, a regulating coil spring co-axial with the spindle biasing the driven one of said cam members into engagement with the other cam member axially and tending to prevent the axial displacement but yieldable upon a predetermined torque buildup to permit the displacement of the said driven cam member, the driving one of said cam members being fixed on said drive shaft for rotation with said shaft and fixed against axial movement relative to said shaft, and means responsive to the axial displacement of the driven one of said cam members, but while the teeth are yet partially interleaved for the transmission of torque to effect stopping of said drive shaft.

3. In a control device for combination with a tube expander having a mandrel, a rotatable drive shaft which is fixed against axial movement, a rotatable spindle retained against axial movement and adapted for retaining the mandrel of the tube expander, said spindle and drive shaft being in axial alignment but independently rotatable, a torque-sensing cam mechanism connecting the drive shaft to the spindle for the transmission of torque to the spindle, said cam mechanism comprising rolling friction-reducing members and co-axial interengaging driving and driven cam members cooperable for the transmission of torque between the cam members and the cam members having axially projecting interleaved teeth provided with opposing helical, parallel cam faces engaging the rolling members serving to transmit torque and to provide an axial component of force tending to displace the cam members relatively axially, a plurality of balls provided in at least three series spaced around the spindle supporting the driven cam member non-rotatably relative to the spindle for axial movement relative to the spindle, a regulating coil spring co-axial with the spindle biasing the driven one of said cam members into engagement with the other cam member axially and tending to prevent the axial displacement but yieldable upon a predetermined torque buildup to permit the displacement of the said driven cam member, the driving one of said cam members being fixed on said drive shaft for rotation with said shaft and fixed against axial movement relative to said shaft, control means responsive to the axial displacement of the driven one of said cam members, but while the teeth are yet partially interleaved or the transmission of torque to effect stopping of said drive shaft, and cooperable means carried by said driven cam member and spindle to limit positively the displacement of the driven cam member axially while the cam members are yet engaged should said control means fail to operate.

4. In a control device for combination with a tube expander having a mandrel, a rotatable drive shaft which is fixed against axial movement, a rotatable spindle retained against axial movement and adapted for retaining the mandrel of the tube expander, said spindle and drive shaft being in axial alignment but independently rotatable, a torque-sensing cam mechanism connecting the drive shaft to the spindle for the transmission of torque to the spindle, said cam mechanism comprising rolling friction-reducing members and co-axial interengaging driving and driven cam members cooperable for the transmission of torque between the cam members and the cam members having axially projecting interleaved teeth provided with opposing helical, parallel cam faces engaging the rolling members serving to transmit torque and to provide an axial component of force tending to displace the cam members relatively axially, a housing enclosing said drive shaft, said spindle and said cam mechanism, said spindle projecting from said housing, and adjusting nut annularly disposed about said spindle and threaded on said spindle closing the housing where said spindle projects through the housing, a regulating coil spring disposed annularly about the spindle extending longitudinally in the housing biased by said adjusting nut and itself biasing the driven one of said cam members into engagement with the other cam member axially and tending to prevent the axial displacement but yieldable under a predetermined pressure of said driven cam member to permit the displacement of the said driven cam member relative to the said driving cam member, said drive shaft and said spindle, and control means responsive to the axial displacement of the said driven cam member, but while the teeth are yet partially interleaved or the transmission of torque to effect stopping of said drive shaft.

5. In a control device structure, the combination of axially aligned independently rotatable driving and driven shaft and a torque-sensing cam mechanism connecting the driving and driven shafts, said cam mechanism comprising co-axial interengaging cam members cooperable for the transmission of torque between the members and the members having teeth in the form of substantially circular segments which project axially and interleave, one shaft supporting one of said members fixedly against axial movement and for rotation of the one said member and shaft together, the other of said shafts supporting the other of said members non-rotatably but for axial movement relative to the said other of said shafts, the said circular segments having helical, parallel cam faces serving to transmit torque and to provide an axial component of force tending to displace the said other cam member axially, each said cam facing extending generally longitudinally but having a lead formed by the cam face and an axial line through said members, friction reducing means providing rolling contact between the cam faces, and a spring biasing the members into engagement with the teeth interleaved and of sufficient capacity to prevent complete separation of the teeth but yieldable upon a predetermined torque to permit a displacement of the said other cam member, and control means actuated by a displacement of the said other cam member.

6. In a control device structure, the combination of axially aligned independently rotatable driving and driven shafts and a torque-sensing cam mechanism connecting the driving and driven shafts, said cam mechanism comprising co-axial interengaging cam members cooperable for the transmission of torque between the members and the members having teeth in the form of substantially circular segments which project axially and interleave, the driving one of said shafts supporting one of said members fixedly against axial movement and for rotation of the one said member and shaft together, the driven shaft supporting the other of said members non-rotatably but for axial movement relative to said driven shaft, the said segments having helical, parallel cam faces serving to transmit torque and to provide an axial component of force tending to displace the said other cam member axially, each said cam face extending generally longitudinally but having a lead formed by the cam face and an axial line through said members, annular rings disposed in contact with the outer and inner surfaces of the teeth, balls retained by the rings against radial movement and abutting adjacent cam faces of the teeth to provide for rolling friction between the teeth, and a spring biasing the members into engagement with the teeth interleaved and of sufficient capacity to prevent complete separation of the teeth but yieldable upon a predetermined torque to permit a displacement of the said other cam member, and control means actuated by a displacement of the said other cam member.

7. In a control device structure, the combination of axially aligned independently rotatable driving and driven shafts and a torque-sensing cam mechanism connecting the driving and driven shafts, said cam mechanism comprising co-axial interengaging cam members cooperable for the transmission of torque between the members and the members having teeth in the form of substantially circular segments which project axially and interleave, the driving one of said shafts supporting one of said members fixedly against axial movement and for rotation of the one said member and shaft together, the driven shaft supporting the other of said members non-rotatably but for axial movement relative to said driven shaft, the said circular segments having cooperating helical, parallel cam faces serving to transmit torque and to provide an axial component of force tending to displace the said other cam member axially, the said segments also having substantially axially extending faces in abutment whereby torque may be transmitted in one rotational direction with substantially no axial component of force, each said axial extending face of a tooth being disposed peripherally around the segment from the said cam face of the segment, and a spring biasing the members into engagement with the teeth interleaved and of sufficient capacity to prevent complete separation of the teeth but yieldable upon a predetermined torque to permit a displacement of the said other cam member, and control means actuated by a displacement of the said other cam member.

References Cited in the file of this patent

UNITED STATES PATENTS

| | | |
|---|---|---|
| 1,886,518 | Beckwith | Nov. 8, 1932 |
| 1,938,720 | Preble | Dec. 12, 1933 |
| 2,102,002 | Hill | Dec. 14, 1937 |
| 2,106,502 | Hawkins | Jan. 25, 1938 |
| 2,389,098 | Welch | Nov. 13, 1945 |
| 2,431,316 | Dudley | Nov. 25, 1947 |
| 2,471,614 | Gilman | May 31, 1949 |
| 2,691,875 | Schmitter | Oct. 19, 1954 |
| 2,727,598 | Mitchell et al. | Dec. 20, 1955 |
| 2,736,950 | Mathews | Mar. 6, 1956 |
| 2,764,272 | Reynolds | Sept. 25, 1956 |
| 2,767,766 | Mathews | Oct. 23, 1956 |
| 2,835,307 | Jorgensen | May 20, 1958 |